United States Patent
Bin Sabtu et al.

(10) Patent No.: US 11,083,179 B2
(45) Date of Patent: Aug. 10, 2021

(54) DUAL-BEARING REEL

(71) Applicant: Shimano Components (Malaysia) SDN. BHD., Johor (MY)

(72) Inventors: Baihaki Bin Sabtu, Johor (MY); Abu Supian Bin Ahmad, Johor (MY); Muhammad Aliff Nazreen Bin Norazmi, Johor (MY); Mohd Syamsul Johary Bin Ismail, Johor (MY); Muhd Syukri Nazry Bin Mustapha, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 58 days.

(21) Appl. No.: 16/722,973

(22) Filed: Dec. 20, 2019

(65) Prior Publication Data
US 2020/0359612 A1     Nov. 19, 2020

(30) Foreign Application Priority Data

May 15, 2019   (JP) .............................. JP2019-091946

(51) Int. Cl.
*A01K 89/01*     (2006.01)
(52) U.S. Cl.
CPC .............................. *A01K 89/01121* (2015.05)
(58) Field of Classification Search
CPC ........ A01K 89/01912; A01K 89/01925; A01K 89/0193; A01K 89/01121; A01K 89/0114
See application file for complete search history.

(56) References Cited

U.S. PATENT DOCUMENTS

| | | | | |
|---|---|---|---|---|
| 5,996,919 | A * | 12/1999 | Murayama | A01K 89/01916 242/279 |
| 6,053,444 | A * | 4/2000 | Yamaguchi | A01K 89/01917 242/280 |
| 2006/0006267 | A1 * | 1/2006 | Hirayama | A01K 89/01928 242/223 |
| 2016/0219853 | A1 * | 8/2016 | Takechi | A01K 89/0183 |
| 2017/0238516 | A1 * | 8/2017 | Ahmad | A01K 87/06 |

FOREIGN PATENT DOCUMENTS

JP             02-116963 U      9/1990

\* cited by examiner

*Primary Examiner* — Emmanuel M Marcelo
(74) *Attorney, Agent, or Firm* — United IP Counselors, LLC

(57) ABSTRACT

A dual-bearing reel includes a reel body, a spool, and a level winding mechanism. The reel body includes a first side plate, a second side plate spaced apart from the first side plate in a left-right direction, and a rod mounting part extending in a front-rear direction. The level winding mechanism includes a worm shaft having a helical groove, an engaging member engaged with the helical groove from a side facing the rod mounting part, a moving member having a housing portion configured to house the engaging member, and a lid member configured to cover the housing portion. The lid member has a bottom surface facing the rod mounting part, and an outer surface that tapers so that the outer diameter increases from the bottom surface toward the worm shaft.

7 Claims, 3 Drawing Sheets

DUAL-BEARING REEL

CROSS-REFERENCE TO RELATED APPLICATIONS

This application claims priority to Japanese Patent Application No. 2019-91946, filed May 15, 2019. The contents of that application are incorporated by reference herein in their entirety.

BACKGROUND

Technical Field

The present disclosure relates to a fishing reel, and particularly to a dual-bearing reel.

Background Information

A level winding mechanism of a dual-bearing reel includes a worm shaft having a helical groove, an engaging member that engages with the helical groove, a moving member having a housing portion for housing the engaging member, and a lid member for covering the housing portion (refer to Japanese Utility Model Application Laid-Open Publication No. 2-116963).

In the dual-bearing reel having the level winding mechanism, when backlash occurs, the fishing line may be entangled with the lid member. As a measure to prevent this entanglement, for example, Japanese Utility Model Application Laid-Open Publication No. 2-116963 discloses a configuration in which a protective member is disposed between the bottom surface of the lid member and a rod mounting part.

BRIEF SUMMARY

In the level winding mechanism disclosed in Japanese Utility Model Application Laid-Open Publication No. 2-116963, assimilability is reduced due to the presence of the plate-like protective member for preventing the entanglement of a line with the lid member. In addition, since the protective member is disposed between the bottom surface of the lid member and the rod mounting part, the distance from the lid member to the rod mounting part is increased which may reduce gripping performance when palming.

The present disclosure has been made in view of the above and an object thereof is to provide a dual-bearing reel capable of reducing the entanglement of a line (fishline) with a lid member of a level winding mechanism using a simple structure.

A dual-bearing reel according to one aspect of the present disclosure includes a reel body, a spool, and a level winding mechanism. The reel body includes a first side plate, a second side plate that is disposed spaced apart from the first side plate in the left-right direction, and a rod mounting part extending in the front-rear direction. The spool is disposed between the first side plate and the second side plate and is rotatably supported by the reel body. The level winding mechanism is disposed in front of the spool. The level winding mechanism includes a worm shaft having a helical groove, an engaging member that engages with the helical groove from a side facing the rod mounting part, a moving member having a housing portion configured to house the engaging member, and a lid member configured to cover the housing portion. The lid member has a bottom surface facing the rod mounting part and an outer surface inclined in a tapered shape so that the outer diameter increases from the bottom surface toward the worm shaft.

In this dual-bearing reel, the outer surface of the lid member is inclined in a tapered shape towards the worm shaft from the bottom surface of the lid member which faces the rod mounting part, and thereby the fishing line is less likely to be entangled with the lid member. That is, the entanglement of the line with the lid member can be reduced with a simple structure without a plate-like protective member or the like for preventing the entanglement of the line. When the fishing line is about to be entangled with the lid member, the fishing line about to be entangled with the lid member can be easily untangled from the lid member by pulling the fishing line. Furthermore, since a member for preventing line entanglement or the like does not need to be disposed between the bottom surface of the lid member and the rod mounting part, the reel body can be made compact and the gripping performance when palming can be improved.

Preferably, the dual-bearing reel further includes a line entanglement preventing member. The line entanglement preventing member is disposed between the lid member and the spool, extends in the left-right direction, and prevents the fishing line from being entangled with the outer surface of the lid member. The distance from a rod mounting surface of the rod mounting part to a surface of the line entanglement preventing member facing the rod mounting part is approximately the same as the distance from the rod mounting surface of the rod mounting part to the bottom surface of the lid member. In this case, in the dual-bearing reel having the line entanglement preventing member, the reel body can be made compact while further reducing the entanglement of the line with the lid member.

Preferably, the dual-bearing reel further includes the line entanglement preventing member. The line entanglement preventing member is disposed between the lid member and the spool, extends in the left-right direction, and prevents the fishing line from being entangled with the outer surface of the lid member. The distance from the rod mounting surface of the rod mounting part to the surface of the line entanglement preventing member facing the rod mounting part is longer than the distance from the rod mounting surface of the rod mounting part to the bottom surface of the lid member. In this case, in the dual-bearing reel having the line entanglement preventing member, the reel body can be made more compact while further reducing the entanglement of the line with the lid member.

Preferably, a straight line that is parallel to the extending direction of the rod mounting part forms an angle with a straight line that is parallel to the outer surface of the lid member, and the angle is 100° or more. In this case, the entanglement of the line with the lid member can be effectively reduced.

According to the present disclosure, a dual-bearing reel capable of reducing the entanglement of the line with the lid member of the level winding mechanism using a simple structure can be provided.

BRIEF DESCRIPTION OF THE DRAWINGS

Referring now to the attached drawings which form a part of this original disclosure.

DETAILED DESCRIPTION

In the following description, when fishing, the direction in which a fishing line is unreeled is referred as the "front" and the opposite direction is referred as the "rear". Further, the term "left and right" indicates the left and right side when a dual-bearing reel 100 (refer to FIG. 1) is viewed from the rear. Further, regarding the terms "top and bottom", when the dual-bearing reel 100 is mounted on a fishing rod, "top" refers to the side on which the fishing rod is mounted, and the opposite side is referred as the "bottom" side. Specifically, descriptions will be made with the upper side as the top side and the lower side as the bottom side in FIG. 1.

Figure 1:
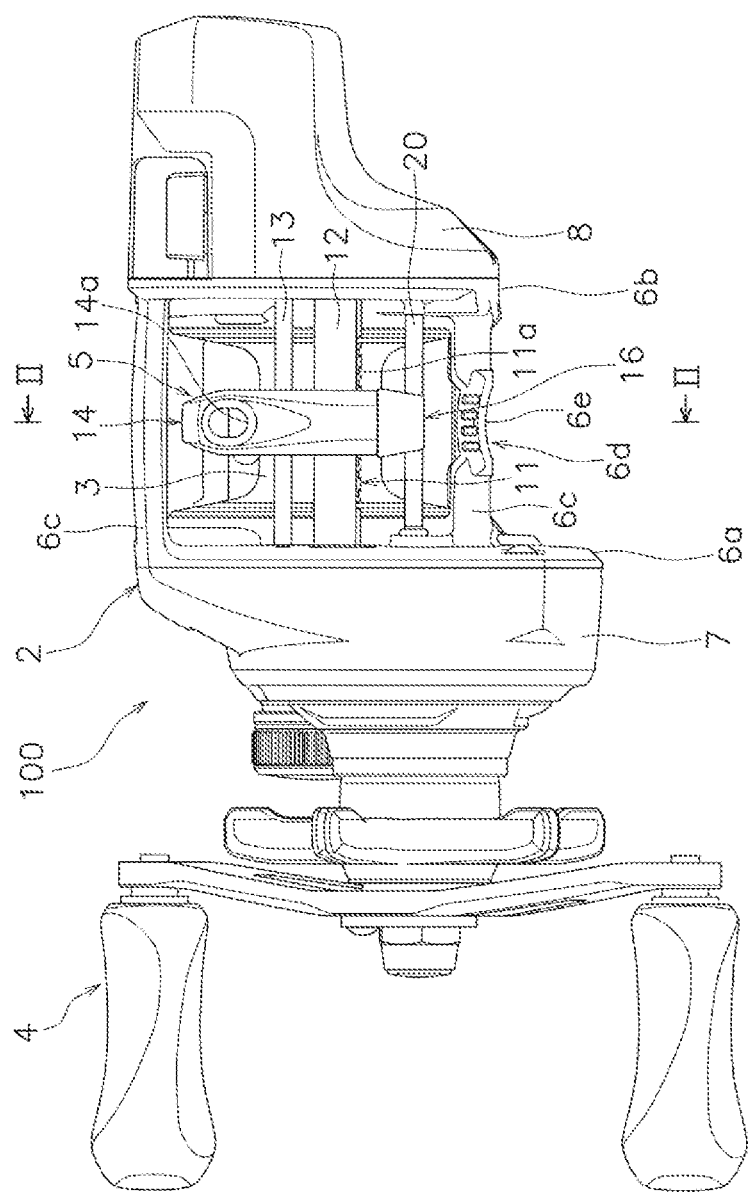
FIG. 1 is a front view of a dual-bearing reel adopting one embodiment of the present disclosure.
Figure 2:
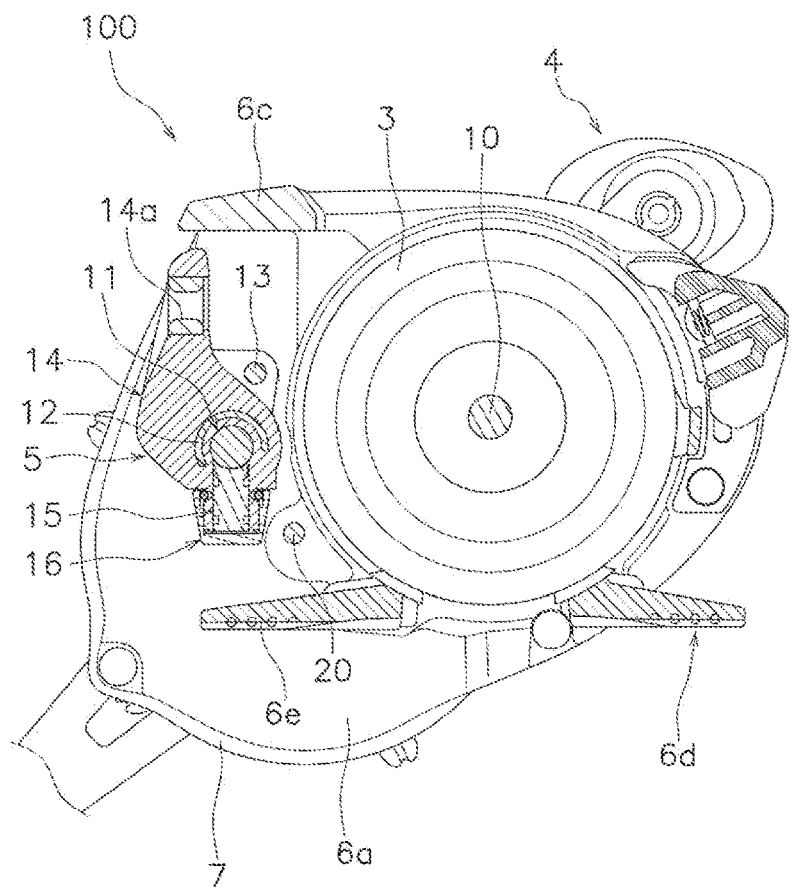
FIG. 2 is a cross-sectional view taken along the section line II-II of FIG. 1.
Figure 3:
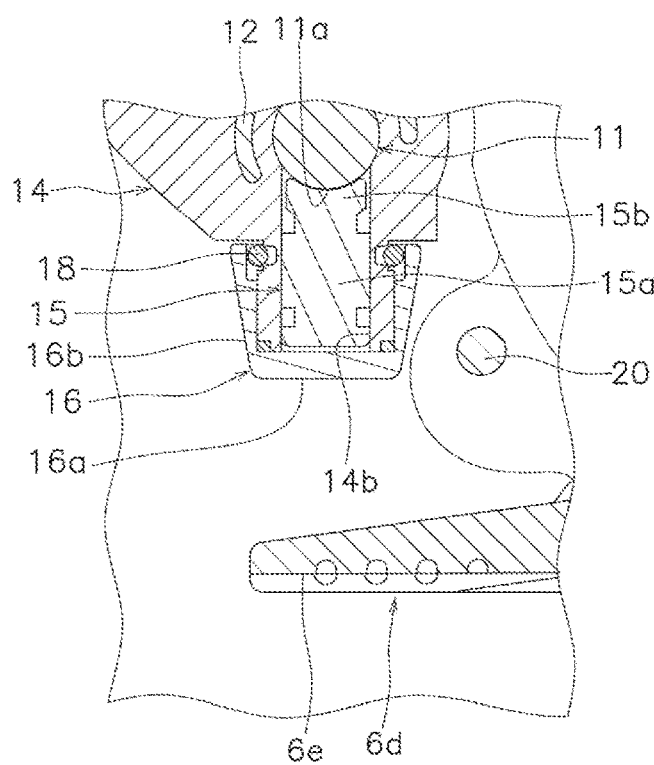
FIG. 3 is an enlarged view of a part of FIG. 2.

FIG. 1 is a front view of the dual-bearing reel adopting one embodiment of the present disclosure. FIG. 2 is a cross-sectional view taken along line II-II in FIG. 1 and FIG. 3 is an enlarged view of a part of FIG. 2. The dual-bearing reel 100 is capable of forwardly releasing a fishing line. As illustrated in FIGS. 1 and 2, the dual-bearing reel 100 includes a reel body 2, a spool 3, a handle 4, and a level winding mechanism 5.

The dual-bearing reel 100 includes a rotation transmission mechanism for transmitting the rotation of the handle 4 to the spool 3, a drag mechanism for braking the rotation of the spool 3 in the line releasing direction, a casting control mechanism for adjusting the braking force acting on the spool 3, a mechanical counter whose numerical value changes according to the rotation of the spool 3, a clutch mechanism, and the like.

The reel body 2 includes a first side plate 6a, a second side plate 6b, a plurality of connecting portions 6c, a rod mounting part 6d, a first side cover 7, and a second side cover 8. In the present embodiment, the first side plate 6a, the second side plate 6b, the plurality of connecting portions 6c, and the rod mounting part 6d are integrally formed.

The first side plate 6a is disposed on the right side of the reel body 2. The second side plate 6b is disposed on the left side of the reel body 2 at an interval in the left-right direction from the first side plate 6a. The plurality of connecting portions 6c extend in the left-right direction and couple the first side plate 6a to the second side plate 6b.

As illustrated in FIG. 2, the rod mounting part 6d extends in the front-rear direction. The rod mounting part 6d has a rod mounting surface 6e on which a fishing rod is mounted. The rod mounting surface 6e is located on the lower surface of the rod mounting part 6d. The rod mounting surface 6e is disposed below the spool 3.

The first side cover 7 covers the right side of the first side plate 6a. The second side cover 8 covers the left side of the second side plate 6b.

The spool 3 is disposed between the first side plate 6a and the second side plate 6b and is rotatably supported on the reel body 2. As illustrated in FIG. 2, the spool 3 is fixed to a spool shaft 10 that penetrates the center of the spool 3 in the left-right direction and rotates integrally with the spool shaft 10.

As illustrated in FIG. 1, the handle 4 is rotatably disposed on the reel body 2 at a position closer to the first side plate 6a. The rotation of the handle 4 is transmitted to the spool 3 via the rotation transmission mechanism.

The level winding mechanism 5 is disposed in front of the spool 3 as illustrated in FIGS. 1 and 2. The level winding mechanism 5 reciprocates in the left-right direction between the first side plate 6a and the second side plate 6b according to the rotation of the handle 4 in the line winding direction. As a result, the fishing line is uniformly wound around the spool 3.

As illustrated in FIGS. 1 to 3, the level winding mechanism 5 includes a worm shaft 11, a guide member 12, a guide shaft 13, a moving member 14, an engaging member 15, and a lid member 16.

The worm shaft 11 extends in the left-right direction and is rotatably supported by the reel body 2 between the first side plate 6a and the second side plate 6b. The worm shaft 11 penetrates the moving member 14 in the left-right direction. As illustrated in FIG. 1, the worm shaft 11 has a helical groove 11a with which the engaging member 15 engages. The helical groove 11a is formed on the outer peripheral surface of the worm shaft 11.

The guide member 12 and the guide shaft 13 are provided to guide the moving member 14 in a direction along the worm shaft 11. As illustrated in FIG. 1, the guide member 12 and the guide shaft 13 are fixed to the reel body 2 and extend in the left-right direction between the first side plate 6a and the second side plate 6b. The guide member 12 and the guide shaft 13 penetrate the moving member 14 in the left-right direction.

The guide member 12 is disposed on the outer peripheral side of the worm shaft 11. In the present embodiment, the guide member 12 has a semi-cylindrical shape and is disposed above the worm shaft 11. The guide member 12 can be a cylindrical member having an opening for exposing the helical groove 11a.

The moving member 14 reciprocates in the left-right direction along the guide member 12 and the guide shaft 13 between the first side plate 6a and the second side plate 6b via the engaging member 15. The moving member 14 has a line guide portion 14a and a housing portion 14b (refer to FIG. 3).

The line guide portion 14a is a hole through which the fishing line passes. The fishing line passing through the line guide portion 14a moves in the left-right direction together with the moving member 14, whereby the fishing line is uniformly wound around the spool 3.

The housing portion 14b is a through hole for housing the engaging member 15 rotatably and extends toward the worm shaft 11 from the moving member 14 on a side facing the rod mounting part 6d. The housing portion 14b has a circular cross section and is open at both ends. In the present embodiment, the housing portion 14b is formed to extend in the vertical direction at the lower part of the moving member 14 so that the helical groove 11a is positioned above the housing portion 14b.

The engaging member 15 engages with the helical groove 11a from a side facing the rod mounting part 6d. The engaging member 15 is rotatably housed in the housing portion 14b of the moving member 14. As illustrated in FIG. 3, the engaging member 15 includes a shaft part 15a and an engaging part 15b. The shaft part 15a is formed in a substantially cylindrical shape and is rotatably housed in the housing portion 14b. The engaging part 15b is located at one end of the shaft part 15a, and the tip engages with the helical groove 11a.

The lid member 16 is a bottomed cylindrical member and covers a side of the housing portion 14b facing the rod mounting part 6d. The lid member 16 covers the shaft part 15a of the engaging member 15 from a side facing the rod mounting part 6d. The inner peripheral portion of the lid member 16 is screwed to the outer peripheral portion of the housing portion 14b, whereby the lid member 16 is fixed to the moving member 14. A seal member 18 is disposed between the inner peripheral portion of the lid member 16 and the outer peripheral portion of the housing portion 14b. The seal member 18 is, for example, an O-ring.

As illustrated in FIG. 3, the lid member 16 has a bottom surface 16a and an outer surface 16b. The bottom surface 16a is a surface facing the rod mounting part 6d of the lid member 16, and the engaging member 15 is disposed above the bottom surface 16a. The bottom surface 16a is disposed below the housing portion 14b and the engaging member 15. In the present embodiment, the bottom surface 16a is a circular surface and extends in a direction along the front-rear direction and the left-right direction.

The outer surface 16b is inclined in a tapered shape so that the outer diameter increases from the bottom surface 16a toward the worm shaft 11. In other words, the outer surface 16b is inclined in a tapered shape so that the outer diameter becomes smaller as it approaches the rod mounting part 6d. In the present embodiment, the outer surface 16b is formed in a conical surface shape and is inclined in a tapered shape so that the outer diameter increases upward from the bottom surface 16a.

Preferably, the dual-bearing reel 100 further includes a line entanglement preventing member 20. As illustrated in FIGS. 1 and 2, the line entanglement preventing member 20 is, for example, a rod-like member, extends in the left-right direction between the first side plate 6a and the second side plate 6b, and is fixed to the reel body 2. As illustrated in FIG. 2, the line entanglement preventing member 20 is disposed between the spool 3 and the lid member 16. The line entanglement preventing member 20 prevents the fishing line from being entangled with the outer surface 16b of the lid member 16.

Figure 4:
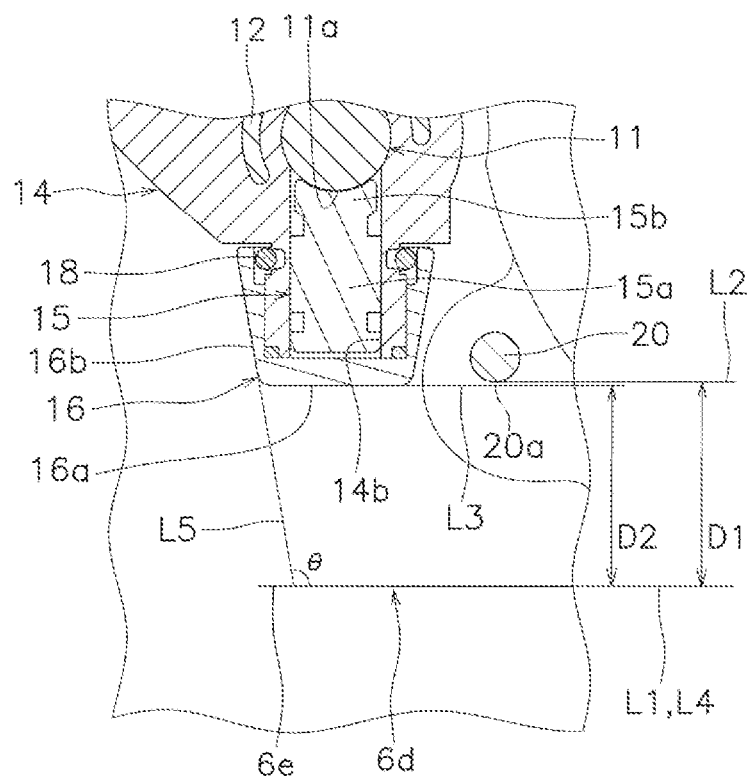
FIG. 4 is an enlarged view of a part of FIG. 2.

FIG. 4 is an enlarged view of a part of FIG. 2 which schematically illustrates the structure of the rod mounting part 6d for easy understanding of the description. As illustrated in FIG. 4, a distance D1 from the rod mounting surface 6e to a surface 20a of the line entanglement preventing member 20 facing the rod mounting part 6d is approximately the same as a distance D2 from the rod mounting surface 6e to the bottom surface 16a of the lid member 16. In the present embodiment, the distance D1 is slightly longer than the distance D2. That is, the surface 20a of the line entanglement preventing member 20 is located above the bottom surface 16a.

In other words, the distance D1 is the distance between a straight line L1 extending along the rod mounting surface 6e and parallel to the direction in which the rod mounting part 6d extends and a straight line L2 contacting the surface 20a of the line entanglement preventing member 20 and parallel to the straight line L1 as viewed from the side. Also, in other words, the distance D2 is the distance between the straight line L1 and a straight line L3 extending along the bottom surface 16a of the lid member 16 and parallel to the straight line L1 as viewed from the side.

Note that the line entanglement preventing member 20 can be disposed at a position overlapping the bottom surface 16a of the lid member 16 in the front-rear direction when viewed from the front. That is, a configuration can be adopted in which the distance D1 is the same length as the distance D2, or the distance D1 can be shorter than the distance D2.

In the dual-bearing reel 100 having the above-described configuration, the outer surface 16b of the lid member 16 is inclined to have a tapered shape from the bottom surface 16a of the lid member 16 toward the worm shaft 11, and therefore the fishing line is less likely to be entangled with the lid member 16. As a result, the entanglement of the line with the lid member 16 can be reduced with a simple structure. Further, when the fishing line is about to be entangled with the lid member 16, the fishing line about to be entangled with the lid member 16 can be easily untangled from the lid member 16 by, for example, pulling the fishing line toward the spool 3.

Furthermore, since a member for preventing line entanglement with the lid member 16 or the like does not need to be disposed between the bottom surface 16a of the lid member 16 and the rod mounting part 6d, the reel body 2 can be made compact and the gripping performance when palming can be improved.

Here, for example, in a case where the outer diameter of the outer surface 16b of the lid member 16 is constant, even if the fishing line is pulled toward the spool when the fishing line is about to be entangled with the lid member 16, the fishing line remains caught on the outer surface 16b of the lid member 16, which makes it difficult to untangle the fishing line therefrom. Therefore, in a case where the outer diameter of the outer surface 16b of the lid member 16 is constant, preferably the line entanglement preventing member 20 is disposed such that the distance D1 is shorter than the distance D2 in order to effectively prevent the line from entangling with the lid member 16 before it happens. However, in this case, the reel body 2 is increased in size which may cause the gripping performance when palming to deteriorate.

On the other hand, in a case where the outer diameter of the outer surface 16b of the lid member 16 is constant and the line entanglement preventing member 20 is disposed such that the distance D1 is approximately the same as the distance D2, the reel body 2 can be made compact. In this case, however, even if the reel body 2 can be downsized, the line entanglement preventing member 20 cannot effectively prevent the line from entangling with the lid member 16 before it happens.

However, according to the dual-bearing reel 100 having the above-described configuration, the fishing line does not easily entangle with the lid member 16 and the fishing line about to be entangled with the lid member 16 can also be easily untangled from the lid member 16. Therefore, the necessity of preventing the entanglement of the line with the lid member 16 can be reduced compared with the case where the outer diameter of the outer surface 16b of the lid member 16 is constant. As a result, even when a configuration where the distance D1 is equal to the distance D2 is adopted or where the distance D1 is longer than the distance D2 as in the present embodiment is adopted to improve the gripping performance at the time of performing palming, the lid member 16 and the line entanglement preventing member 20 can reduce the occurrence of trouble due to the line entanglement with the lid member 16.

As illustrated in FIG. 4, in a side view, preferably, an angle θ formed by a straight line L4 parallel to the extending direction of the rod mounting part 6d and a straight line L5 parallel to the outer surface 16b of the lid member 16 is 100° or more. Moreover, it is preferable that the angle θ is 130° or less. As a result, the entanglement of the line with the lid member can be effectively reduced while reducing an increase in the diameter of the lid member 16. Further, when the fishing line is about to be entangled with the lid member 16, the fishing line can be further easily untangled from the lid member 16.

OTHER EMBODIMENTS

One preferred embodiment of the present disclosure has been described above; however, the present disclosure is not limited to the above embodiment, and a variety of changes can be made without departing from the scope of the present disclosure. In particular, a plurality of embodiments and modifications described in the present specification can be arbitrarily combined on an as-needed basis.

(a) In the above embodiment, the present disclosure is adopted in a dual-bearing reel including a mechanical counter. However, the present disclosure can be applied to a dual-bearing reel having another configuration including an electric reel.

(b) In the above embodiment, the bottom surface 16a of the lid member 16 extends in the direction along the front-rear direction and the left-right direction. However, the lid member 16 can be tilted so that the rear end of the bottom surface 16a is positioned above the front end of the bottom surface 16a. In this case, it is preferable that the tilt (for example, less than 10°) be within a range that does not affect the attachment/detachment of the lid member 16. When the lid member 16 is tilted, the engaging member 15 and the housing portion 14b of the moving member 14 are also configured to tilt in the same way as the lid member 16. In this case, the distance D2 is the distance from the rod mounting surface 6e to the front end of the bottom surface 16a.

REFERENCE SIGNS LIST 2 reel body
3 spool
5 level winding mechanism
6a first side plate
6b second side plate
6d rod mounting part
6e rod mounting surface
11 worm shaft
11a helical groove
12 guide member
14 moving member
14b housing portion
15 engaging member
16 lid member
16a bottom surface
16b outer surface
20 line entanglement preventing member
100 dual-bearing reel

What is claimed is:

1. A dual-bearing reel, comprising:
   a reel body including a first side plate, a second side plate disposed spaced apart from the first side plate in a left-right direction, and a rod mounting part extending in a front-rear direction;
   a spool disposed between the first side plate and the second side plate, and rotatably supported by the reel body; and
   a level winding mechanism disposed in front of the spool, and the level winding mechanism including
      a worm shaft having a helical groove,
      an engaging member engaged with the helical groove from a side facing the rod mounting part,
      a moving member having a housing portion configured to house the engaging member, and
      a lid member configured to cover the housing portion,
   the lid member having a bottom surface facing the rod mounting part, and an outer surface inclined in a tapered shape along substantially the entire length of the lid member so that an outer diameter of the lid member increases from the bottom surface toward the worm shaft.

2. The dual-bearing reel according to claim 1, further comprising
   a line entanglement preventing member that is disposed between the lid member and the spool, extends in the left-right direction, and configured to prevent the fishing line from being entangled with the outer surface of the lid member,
   wherein a distance from a rod mounting surface of the rod mounting part to a surface of the line entanglement preventing member facing the rod mounting part is substantially equal to a distance from the rod mounting surface of the rod mounting part to the bottom surface of the lid member.

3. The dual-bearing reel according to claim 1, further comprising
   a line entanglement preventing member that is disposed between the lid member and the spool, extends in the left-right direction, and configured to prevent the fishing line from being entangled with the outer surface of the lid member,
   wherein a distance from a rod mounting surface of the rod mounting part to a surface of the line entanglement preventing member facing the rod mounting part is longer than a distance from the rod mounting surface of the rod mounting part to the bottom surface of the lid member.

4. The dual-bearing reel according to claim 1, wherein an angle between a straight line parallel to an extending direction of the rod mounting part and a straight line parallel to the outer surface of the lid member is 100° or more.

5. The dual-bearing reel according to claim 1, wherein the level winding mechanism further includes a guide member configured to guide the moving member so that the moving member moves along the guide member in the left-right direction between the first side plate and the second side plate.

6. The dual-bearing reel according to claim 1, wherein the lid member is fixed to the moving member by screwing an inner peripheral portion of the lid member to an outer peripheral portion of the housing portion.

7. The dual-bearing reel according to claim 1, wherein the bottom surface of the lid member is disposed below the housing portion and the engaging member.

* * * * *